United States Patent [19]

McCabe

[11] Patent Number: 5,711,653
[45] Date of Patent: *Jan. 27, 1998

[54] AIR LIFTED AIRFOIL

[76] Inventor: Francis J. McCabe, #6 Bunker Hill Rd., Ottsville, Pa. 18942

[*] Notice: The term of this patent shall not extend beyond the expiration date of Pat. No. 5,599,172.

[21] Appl. No.: 685,134

[22] Filed: Jul. 24, 1996

Related U.S. Application Data

[63] Continuation-in-part of Ser. No. 507,129, Jul. 31, 1994, Pat. No. 5,599,172.

[51] Int. Cl.[6] ............................................. F04D 29/38
[52] U.S. Cl. ........................................ 416/237; 416/223 R
[58] Field of Search .............................. 416/223 R, 228, 416/235, 236 R, 237, 197 R, 197 A, 197 B; 244/198, 218

[56] References Cited

U.S. PATENT DOCUMENTS

| | | | |
|---|---|---|---|
| 4,655,122 | 4/1987 | McCabe | 137/512.1 |
| 5,599,172 | 2/1997 | McCabe | 417/334 |

FOREIGN PATENT DOCUMENTS

| | | | |
|---|---|---|---|
| 0039960 | 1/1937 | Netherlands | 416/197.4 |

*Primary Examiner*—Christopher Verdier
*Attorney, Agent, or Firm*—Frank Benasutti

[57] ABSTRACT

An aerodynamic-shaped airfoil having a cross-section which is essentially an inverted pan-shape with a leading edge into the wind and a trailing edge which has a flange doubled back underneath, toward the leading edge.

1 Claim, 3 Drawing Sheets

AIR LIFTED AIRFOIL

CROSS REFERENCE TO RELATED APPLICATION

This application is a continuation-in-part of my prior application Ser. No. 08/507,129 filed Jul. 31, 1995, now U.S. Pat. No. 5,599,172 entitled WIND ENERGY CONVERSION SYSTEM the disclosure of which is incorporated herein by reference.

TECHNICAL FIELD

This invention relates to improvements in air activated airfoils; and more particularly to the aerodynamic shape of an airfoil to exhibit improved lift characteristics.

BACKGROUND ART

In the prior art, a wide variety of shapes have been used to harness the power of air. See, for example, the schematic prior art drawings shown in FIGS. 1A–1D. These shapes are designed primarily to act in response to air flowing in the direction of the arrow identified as "air flow" in FIGS. 1–3, impacting upon the angle of attack at which the airfoil blade is mounted, and causing the blade to lift. In a typical airplane blade, for example, the angle of attack is such that a negative pressure is created above the wing (blade or airfoil) and the wing rises as the air flows across it.

In my prior art U.S. Pat. No. 4,655,122, I disclosed an improved aerodynamic shape which comprised essentially a planar face portion and leading and trailing edges associated with opposing ends of the face portion to develop a pan-shaped enclosure shown more particularly in a detailed cross section of FIG. 4 of that patent. This blade was shown in use in an air damper where one or more blades were pivoted for rotation within a frame. In that environment, the blades provided an increased lift when forced to open by escaping air from a structure, and thus this permitted the blades to be constructed of a relatively heavy gauge material without compromising damper efficiency.

Also in the prior art, it was known to use windmills with air compressor units that are powered by the wind energy turning the windmill, to store air under pressure for use, for example, in generating electricity. See for example U.S. Pat. Nos. 4,055,950; 4,236,083 and 4,447,738.

Windmill type designs have also been used in wind turbines with various shaped impeller blades disposed at various angles and encased in a cowling designed to direct the wind over the blades. See for example U.S. Pat. Nos. 1,025,428; 4,021,135; 4,140,433; 4,132,499; 4,133,992; 4,324,985 and 4,720,640.

One of the primary goals of the prior art windmill configurations was to get more revolutions per minute (rpm) out of the device at lower wind speeds and more power at similar rpm. Thus, the blade configurations were such as to pass air quickly through the device. To do this, the blades would be so configured and positioned for maximum power and not to interfere with each other's air flow.

One of the problems with prior art windmill devices was that in sustained high winds they would tend to "run away" and burn up. Furthermore, at low winds or intermittent winds, they could not produce the sustained energy, i.e. constant speed, necessary to produce, for example, electricity.

In my work with windmills, I experimented with various shaped blades, such as that disclosed in my co-pending application, Ser. No. 08/507129, filed Jul. 31, 1995, now U.S. Pat. No. 5,599,172, for a wind energy conversion system. Therein, I disclosed a new wind energy conversion system for particular application to stored energy, such as compressed air. In accordance with my invention, energy was extracted from the air movement at low speeds. The configuration and spacing of the blades and the shaping of the device which supports them was such that there was an interaction between adjacent blades to provide more torque at slower speeds. In accordance with my device, I collected as much air as possible within the device, and thus I collected as much force as possible. Further, the shape, positioning and configuration of the blades within the device tended to prevent it from running away; in other words, there was actually a rotary speed limiting effect.

It became apparent to me that the preferred blade structure had characteristics which were not known in the prior art.

DISCLOSURE OF THE INVENTION

Summary of the Invention

I have invented an aerodynamic-shape for an airfoil comprising a blade having a cross-sectional shape comprising a planar face portion and leading and trailing edges associated with opposite edges of the face portion to form a structure essentially cross-sectional pan-shaped disposed in an inverted position; and having a flange extending from the trailing edge underneath the blade back toward the leading edge. The leading edge is defined by the edge which is directed into the flow of air.

DESCRIPTION OF THE PREFERRED EMBODIMENTS

Figure 1A:
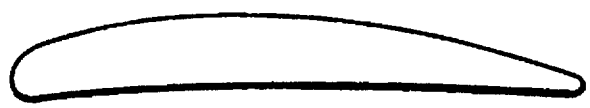
FIGS. 1A–1D are schematic views of various prior art cross-sections of blades.
Figure 1B:
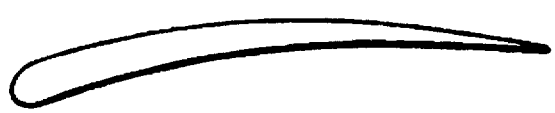
Figure 1C:
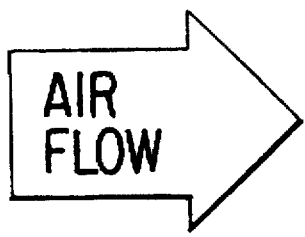
Figure 1C:
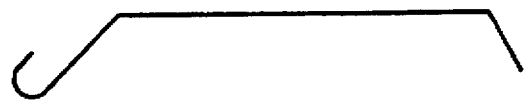
Figure 1D:
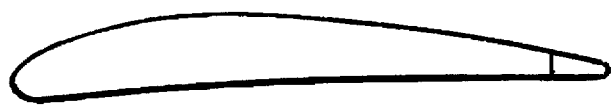
Figure 2:
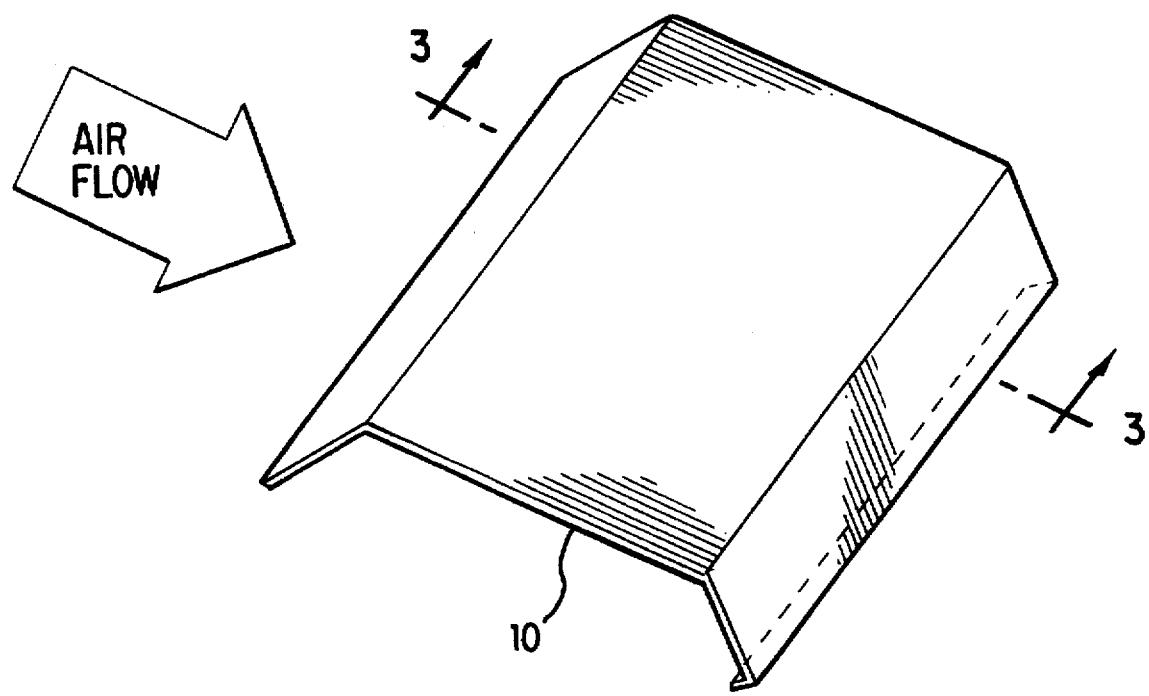
FIG. 2 is a perspective view of the preferred embodiment of my invention.

Referring to the Figures, FIG. 2 shows a perspective view of an airfoil or blade 10 in accordance with my invention.

Figure 3:
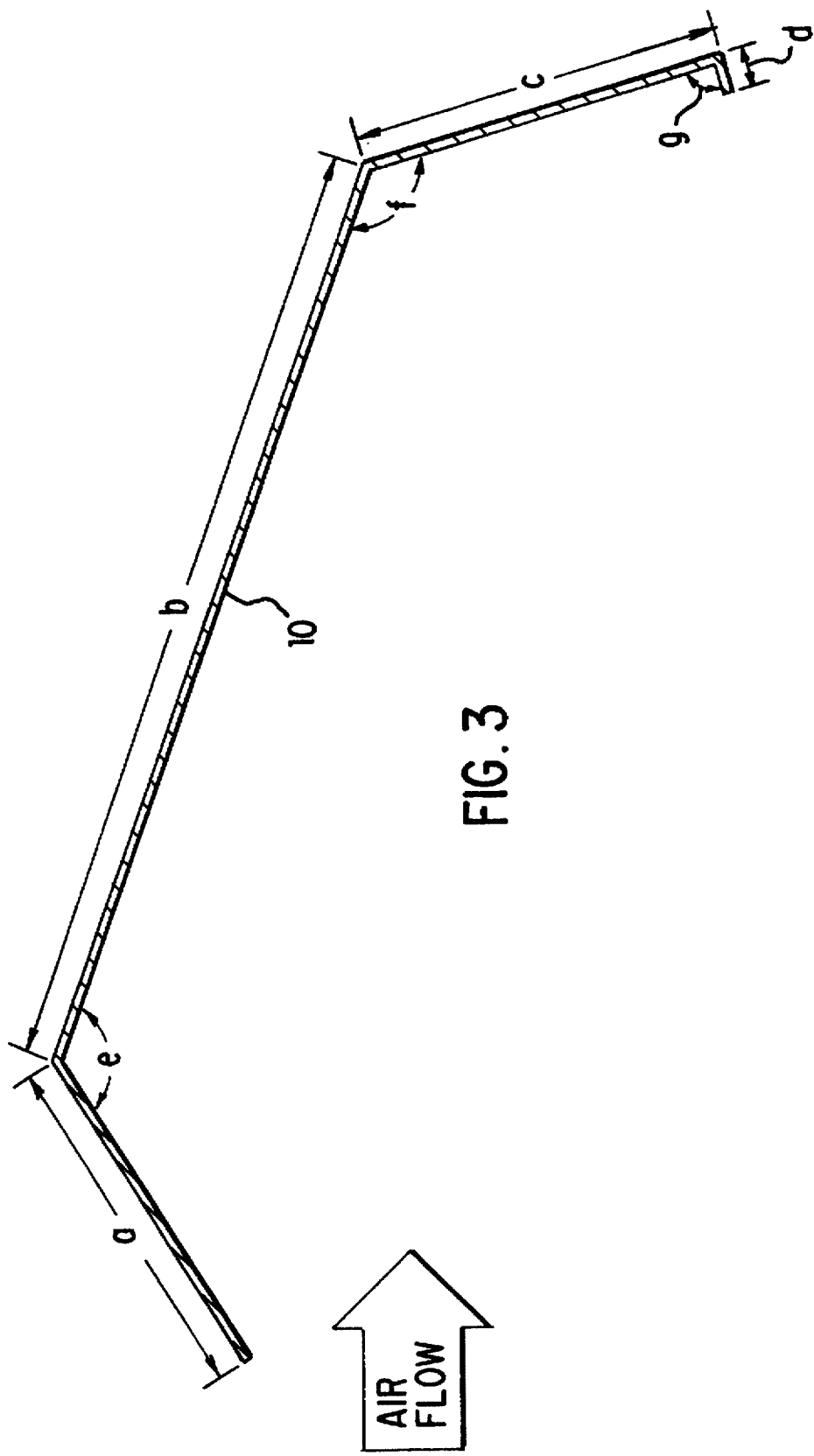
FIG. 3 is an enlarged cross-sectional view of the blade shown in FIG. 2 taken as indicated by the lines and arrows 3—3.

Referring now to FIGS. 2 and 3, I will describe in detail the blade 10. As an example of the exact measurement and construction of this blade for use in a small (under ten feet diameter) working windmill, the dimensions are as follows: the leading edge, a=4"; the planar portion, b=11.5"; the trailing edge, c=4.125"; the flange, d=0.562"; angle e is 130°; angle f is 127°; and angle g is 90°. The material used is 11 gauge aluminum.

The cross-sectional shape of this blade shows that it comprises essentially a planar face portion "b" and leading "a" and trailing "c" edges associated with opposite longitudinal edges of said face portion, such that the cross-sectional shape is an inverted pan-shaped enclosure; with a flange "d" extending from the trailing edge "c" back toward the leading edge "a".

This blade is mounted so that the wind impinges first upon the lead edge "a".

In actual tests, a windmill unit with blades at 36 degrees needed wind at 7 mph to overcome inertial forces and start the windmill turning. A wind of 3 mph was necessary to maintain its rotation. When blade angles were increased, threshold speeds were higher and running speeds increased.

Thus, it was determined that the optimum blade setting for low winds seemed to be better at shallower angles.

It is theorized that the preferred blade shape and positioning captures air rather than let it pass freely through the apparatus. This has several effects. First, it causes aerodynamic lift. Secondly, it can trap air and increase the driving force. Also, in a windmill, for example, the adjacent blade can enhance the lift. The device will not continuously accelerate and burn up because the relative wind change due to rotation reduces lift acting as a braking action as the angle of attack approaches the zero lift range. In operation, this means that the device collects as much force as possible, even though it is going slower rather than faster; as in the prior art. For example, at a 60 to 65 mph wind, the maximum speed of a small size mill would be approximately 100 revolutions per minute (rpm).

It has been observed that with less blades there is greater speed, while, when using this device with more blades, there is more torque and lower speed.

A number of prior art blade shapes, as shown by the shapes illustrated schematically in FIGS. 1A through 1D, were tested using a wind tunnel. The blades shown from the top are: blade 1A, an ordinary air foil carved from balsa wood in the shape used by NACA (the predecessor of NASA) for lower speed aircraft (such as gliders or model airplanes) to provide the highest lift known; a fan blade air foil made of plastic, 1B; an air foil blade of the type shown in U.S. Pat. No. 4,655,122, 1C; and an air foil with a flap at the back (also per NACA) as shown in 1D.

Experiments focused on the torque enhancement from air flow inducement provided by windmills and blades or "air dams" which were designed to harness the most force possible from a given air flow. Blades were selected for their ability to maximize force. Tests were conducted to establish a relationship between air mass flow and volume stored under pressure (density). The object was to determine the spacing and fluid flow interaction between blades which would yield the most force, thus determining the number of blades to be used in a windmill. For preliminary testing, it was decided to use fourteen blades in an eight foot windmill. A total of seventeen blade prototypes were made and tested. The drawings, FIGS. 1A through 1D each show a representative sample of a prior art blade cross-sectional configuration. FIGS. 2 and 3 show my invention; which was also tested.

The testing involved several steps. First, each blade was installed at a specified angle (the installment angle range was 20° through 35° at intervals of 5°; and sometimes included readings at 15°). The blades were balanced to insure equilibrium prior to starting the air flow. With the wind on, two measurements were taken: maximum upward force and optimum angle at which the maximum force occurred. Testing progressed with three things in mind:

1. Optimum position (forward or backward for either or both blades);
2. Spacing between blades that would yield the highest force readings; and
3. The angle of the blades which would yield the highest force readings.

The most important relationship found in this testing insofar as windmills were concerned was the spatial arrangement of the blades. It is theorized that while blade position is not the most important factor concerning the pattern of force reading; it is a very important factor in the magnitude of the force readings. Thus, it was determined that the highest force readings occurred when two blades, configured as in FIG. 3, were positioned in a wind tunnel test where one was mounted over another, and were in the position relative to the air flow as shown in FIG. 3.

While what I have described has been described in connection with a windmill application, it should be apparent that what I have invented is a blade whose shape produces lift which can be used in a propeller or impeller or fan. I believe the propeller/impeller blades can be enhanced by a tapered shape and by transitioning from the slower (wind mill air speed range) shape at the hub to a flatter angled pan-shape with shorter forward facing trailing edge flanges at the (faster moving) tips. This aerodynamic shape builds up pressure underneath rather than relying on negative pressure on the top, because, I theorize, the air is dammed up within the blade envelope. In the prior art, for example, the ordinary airfoil can be mounted with an angle of attack which goes from 15° to 26° and then "stalls" (begins upper surface separation and turbulence). With this blade shape, it is possible to start lower and go further, i.e., 7° to 45°. Further, if one were to plot lift versus angle of attack, the curve past 26° would ordinary drop off. With this blade, it is essentially a flat curve. I have observed that there is as little as 7½% deviation from 25° to 45°.

I also note that the shallower the angle of attack, the more the blade acts as a normal airplane blade wing shape. When the angle gets to approximately 32°, more air is trapped within the blade envelope, particularly because of the back angled flange and, thus, there is provided greater upward thrust.

In a steep angle between 30° to 45°, I believe the blade is no longer working as an airplane blade wing would, in that the negative pressure along the top of the wing is the lesser means by which force is being imparted; rather the airfoil is being air lifted.

What I claim is:

1. An airfoil for use in a flowing air stream, having a shape comprising a planar face portion and leading and trailing longitudinal edge portions associated with opposite edges of the face portion to form, in cross-section, an essentially inverted pan-shaped structure when disposed with its leading edge facing into the flow of air, and having a planar flange portion extending at an angle of approximately 90 degrees from and beneath the trailing edge portion back toward the leading edge portion.

* * * * *